United States Patent Office 3,371,071
Patented Feb. 27, 1968

3,371,071
PRESSURE SENSITIVE ADHESIVE
COMPOSITIONS
Berry A. Brooks, Middlesex, and Benjamin D. Jubilee, Jr., Plainfield, N.J., assignors to National Starch and Chemical Corporation, New York, N.Y., a corporation of Delaware
No Drawing. Filed Jan. 18, 1965, Ser. No. 426,424
14 Claims. (Cl. 260—78.5)

ABSTRACT OF THE DISCLOSURE

Pressure sensitive adhesives characterized by their excellent properties of tack, tack retention and cohesive strength and the substrates coated therewith; said adhesives being based upon random copolymers containing specified proportions of octyl acrylate, ethyl acrylate, vinyl acetate and maleic anhydride and which are prepared by means of free radical initiated polymerization procedures.

---

This invention relates to the preparation of novel adhesive compositions, and more particularly, to the preparation of compositions which are especially suited for use as pressure sensitive adhesives.

As is known in the art, pressure sensitive adhesives comprise a class of adhesive compositions which may be formulated from a variety of materials such as gums and resins of both natural and synthetic derivation. When coated on a suitable substrate, these adhesive compositions share the common characteristic of being aggressively and permanently tacky at room temperature and are thus able to adhere to surfaces by the application of nothing more than manual pressure. Adhesives of this type may be applied to various substrates such as paper, cloth and plastic films and the resulting coated substrates may then be converted to tapes and labels which are especially useful in the packaging field for any number of applications involving marking, sealing, reinforcing or banding.

In order to be satisfactory in commercial usage, a pressure sensitive adhesive must, of course, possess good tack and tack retention properties; that is, the adhesive must firmly adhere to various surfaces and the adhesive films thereof should continue to toughen on aging. An equally important property of such an adhesive in many applications is that of high internal strength, i.e. good cohesion. High internal or cohesive strength is a necessary characteristic of any adhesive composition which is to be employed in preparing adhesive products which must support considerable amounts of weight. It is also necessary that the property of high internal strength be instilled in a pressure sensitive adhesive without adversely affecting its tack and tack retention properties. Previously, internal strength had been imparted to pressure sensitive adhesives by such means as incorporating high molecular weight polymers in the adhesive formulation. Methods such as this one, however, have generally proved unsatisfactory since cohesive strength was attained only at the expense of sacrificing the tack and adhesion properties of the composition.

It is the object of this invention to prepare novel copolymers for use in pressure sensitive adhesives which display excellent properties of tack, tack retention and cohesive strength and which are characterized by their ready adhesion to a wide variety of substrates. Another object of this invention is the use of said adhesives to prepare pressure sensitive tapes and labels. Other objects and the advantages of this invention will be apparent from the following description.

In accordance with the invention, copolymers ideally suited for use in pressure sensitive adhesives which display excellent tack, tack retention and cohesive strength are prepared by copolymerizing monomers which impart these latter characteristics to the resulting copolymers. Thus, the comonomers which are used in preparing our novel copolymers are octyl acrylate, ethyl acrylate, vinyl acetate and maleic anhydride. The maleic anhydride is present in our copolymers in concentrations of from about 4 to 10 parts, by weight, and preferably 6.5 to 9.0 parts, by weight, of the resulting copolymer and serves to provide these novel copolymers with their excellent adhesive properties due to the presence of the anhydride group. The octyl acrylate is present in our copolymers in concentrations of from about 55 to 80 parts, by weight, and preferably from 60 to 70 parts, by weight, of the resulting copolymer and functions as the primary tackifier and flexibilizer. The vinyl acetate is present in our copolymers in concentrations of from about 10 to 30 parts, by weight, and preferably from 16 to 22 parts, by weight, of the resulting copolymer and provides the copolymer with strength and body. In addition, the ethyl acrylate is present in our copolymers in concentrations of from about 5 to 20 parts, by weight, and preferably from 8 to 12 parts, by weight, of the resulting copolymer and is incorporated in order to provide added strength and flexibility. The necessity for having all these components present within our formulation is vividly demonstrated when attempts are made to prepare operable pressure sensitive adhesive copolymers which do not contain all of the above listed comonomers or which do not contain them within the above stated range of proportions.

In general, the procedure for preparing the novel adhesive copolymers of our invention begins with the addition to a reaction vessel, of from about 60 to 70% of the total weight of the maleic anhydride which is to be utilized, of from about 60 to 80% of the total weight of vinyl acetate to be utilized, of from about 45 to 55% of the total weight of the octyl acrylate which is to be utilized, of from about 45 to 55% of the total weight of the ethyl acrylate which is to be utilized and of from about 20 to 30% of the total weight of the selected solvent. A free radical initiator in a concentration of about 0.1 to 0.3% by weight of the total monomer charge, is then added and the mixture is heated, with stirring, till reflux occurs. About 3 to 8 minutes after refluxing has started, the remainder of the maleic anhydride, vinyl acetate, octyl acrylate and ethyl acrylate along with the remainder of the selected solvent is slowly and uniformly added over a 3 to 4 hour period, while the mixture is maintained under agitation, at the reflux temperature. In this manner the monomers are added at a rate such as to facilitate the preparation of homogeneous copolymers.

The free radical initiator which may be used can be selected from the group consisting of azobis-isobutyronitrile, benzoyl peroxide, lauryl peroxide, etc. Applicable solvents for the system include methylene chloride, ethylene dichloride, methyl acetate, ethyl formate, cyclohexane and toluene, as well as mixtures thereof. Low boiling solvents are preferably used in the preparation of the polymeric lacquers in order to maintain sufficiently high intrinsic viscosity values as well as to provide quick drying on application. In addition, suitable diluents for the system include aliphatic hydrocarbons such, for example, as pentane and heptane, aliphatic ketones such, for example, as methyl ethyl ketone, and aliphatic esters such, for example, as methyl acetate, as well as mixtures thereof.

Approximately 1 to 2 hours after the completion of the monomer addition, additional solvent is added so that the copolymer resin solids content of the copolymer lacquer is within the desired range. The reaction mix is then heated for another 6 to 8 hours while its temperatures is maintained at reflux. Polymerization is complete at this point and the product is then cooled to room temperature.

As will be recognized by those skilled in the polymer art, the copolymers resulting from a free radical initiated polymerization procedure of the type here described are to be characterized as "random" copolymers wherein the moieties derived from the respective monomers are randomly distributed throughout the polymer chain. Such random copolymers are to be contrasted with the configuration of the so-called block or graft copolymers wherein the moieties derived from the various monomers are in a regular or sequential distribution throughout the polymer molecule.

The final polymeric resin solids content should range from about 38 to 40%, by weight, which indicates a monomer conversion rate of greater than 92%, by weight. The resulting lacquers are clear with a characteristic slight yellow cast. The preferred minimium intrinsic viscosity of our novel copolymers, as determined in acetone at 25° C., should be not less than about 0.90. The glass transition temperature (Tg) of the resulting copolymers should preferably fall within the range of about −45 to −65° C.

The above stated minimum intrinsic viscosity value of 0.90, as determined in acetone at 25° C., is required in order that the novel copolymers of this invention should be able to exhibit optimum pressure sensitive properties. However, where this degree of performance is not essential, copolymers of a somewhat lower intrinsic viscosity and possibly a higher solids content, may also be useful for certain applications.

In using the novel adhesive copolymeric lacquers of our invention, they may be applied to substrates by means of any coating technique whose use is desired by the practitioner. Thus, the copolymeric lacquers may be sprayed onto a substrate or they may be applied by the use of any mechanical coating process, such as air knife, trailing blade, reverse roll or gravure coating techniques. Our copolymers, inasmuch as their cast films are usually exceedingly tacky, are usually applied at a coating weight which gives a dry film thickness of about 0.4 to 2.4 mil. The coating weights at which these lacquers are applied will, of course, vary according to the copolymer preparation and the specific end use application.

Our adhesive copolymer lacquers may be coated onto a virtually unlimited variety of substrates, including paper, cloth, paperboard, metal sheets and foils, fiber glass, foamed plastics, rubber, cellophane, wood and plastic films and sheets, such as those derived from polyethylene terephthalate, polystyrene, rubber hydrochloride, polyethylene, polypropylene, polyvinyl chloride and polyvinylidene chloride. Moreover, these novel adhesive products may be used for the bonding and lamination of any of the above listed substrates.

After air drying, the resulting adhesive films exhibit superior pressure sensitive properties. In order to demonstrate the extraordinary characteristics of tack, tack retention and cohesion of the novel adhesive copolymers of this invention, the tests, as described below, may be employed.

20° "Hold" Test.—This test measures a combination of adhesive and cohesive properties. In conducting this test, films of the adhesives being evaluated are applied to a polyethylene terephthalate film backing in a 3 mil wet thickness. The test samples, which are one inch in width and three inches in length, are securely adhered by thumb pressure to the top of a ½-inch chrome-steel bar tilted 20° from the vertical; the dimensions of the adhere area being ½-inch by one inch. The portion of the sample that extends downward is folded back approximately one inch and a 500-gram weight is secured to its lower extremity. The time required for the sample to fail, that is, for the film to separate or delaminate form the bar, is recorded as the 20° hold time. Since a 20° hold time of 24 hours is generally considered, by those skilled in the art, to be sufficient to classify an adhesive as "superior," all the samples that were tested and which passed the 24 hour mark were removed from the bar and assigned at 20° hold value of "24+" hours.

After failure occurs, "transfer" observations are made to determine the amount of adhesive transferring from the sample and thus adhering to the metal bar. Needless to say, it is advantageous to have cohesive transfer with samples exhibiting a long "hold" time.

180° "Hold" Test.—This test is identical to the 20° "Hold" Test, as described above, except that the chrome-steel bar is in a position in which the specimen makes a 180° angle with the vertical. The 500 gram weight is added and the time required for the film to separate or delaminate from the bar is recorded as the 180° hold time. Since a 180° hold time of 3 days is generally considered, by those skilled in the art, to be sufficient to classify an adhesive as "superior," all of the samples that were tested and which passed the 3-day mark were removed from the bar and assigned a 180° hold value of "3+" days.

180° Peel Adhesion Test.—This standard adhesion test, as described in ASTM D–1000, serves to measure the internal strength of the adhesive compositions of this invention. The samples are prepared in the manner described in the 20° "Hold" Test, above. The test consists of measuring the force necessary to strip or delaminate the adhesive test sample at a 180° angle from a stainless steel panel at a rate of pull of 12 inches per minute. An Instron Tensile Tester is used to provide the pulling force. Thus, the force necessary to effect delamination is recorded as the 180° peel force.

In the following examples, which further illustrate the embodiment of our invention, all parts are given by weight unless otherwise noted.

EXAMPLE I

This example illustrates the preparation of the novel adhesive copolymers of this invention.

The following concentrations of the respective comonomers were utilized:

|  | Parts | |
| --- | --- | --- |
|  | Portion No. 1 | Portion No. 2 |
| Maleic anhydride | 5 | 2.5 |
| Vinyl acetate | 15 | 5 |
| Octyl acrylate | 35 | 35 |
| Ethyl acrylate | 5 | 5 |

A reaction vessel fitted with a thermometer, stirrer, addition funnel and condenser was charged with the ingredients of portion #1, as outlined above, along with 0.2 parts of azobisisobutyronitrile and 20 parts of methylene chloride. The mixture was heated, while under agitation, until refluxes was attained at 74–75° C. Five minutes after reflux was initiated, the ingredients of portion #2 along with 55 parts of methylene chloride were slowly and uniformly added over a three hour addition period. The reflux temperature dropped continuously and leveled off at 51–53° C. at the end of the three hour addition period. One hour after the completion of the addition procedure, 75 parts of toluene were added and the reflux temperature rose to 64–67° C. The solution was then heated at reflux for an additional six hours. At this point polymerization was complete and the reaction mixture was cooled to about 22° C.

The resulting copolymer lacquer was clear with a slight yellow cast. The total amount of copolymer resin solids in the lacquer was 39–40%, by weight, indicating a conversion of monomer to polymer of 94–96%, by weight. The intrinsic viscosity, as measured in acetone at 25° C., was 1.1, while the glass transition temperature was −55° C. The composition of the resulting copolymer on a parts, by weight, basis was 20:70:10:7.5 vinyl acetate:octyl acrylate:ethyl acrylate:maleic anhydride.

EXAMPLE II

This example illustrates the beneficial adhesive properties imparted to the novel copolymers of this invention as a result of the inclusion, therein, of maleic anhydride. It further illustrates the optimum concentration range of maleic anhydride.

The polymerization recipe and polymerization procedures used in this example were identical to those set forth in Example I, hereinabove, with the exception that the concentration of maleic anhydride was varied, as indicated in the following table. The resulting copolymers were then evaluated by means of the above described 20° "Hold," 180° "Hold" and 180° Peel Adhesion Tests. The results of these evaluations are also presented in the following table.

| Copolymer No. | Maleic Anhydride (parts, by weight, in resulting copolymer) | Intrinsic Viscosity (in acetone at 25° C.) | 20° Hold (hours) | Transfer | 180° Hold (days) | 180° Peel (lbs.) | Tack |
|---|---|---|---|---|---|---|---|
| (1) | 0 | 0.95 | 3.3 | Heavy | <1 | 1.4 | Excel. |
| (2) | 5.0 | 1.05 | 0.3 | Slight | <2 | 2.3 | Excel. |
| (3) | 6.5 | 1.04 | 2.0 | None | 3+ | 4.5 | Good. |
| (4) | 7.0 | 1.21 | 24.0+ | Heavy | 3+ | 3.8 | Do. |
| (5) | 7.5 | 1.10 | 24.0+ | ----do---- | 3+ | 6.0 | V. good. |
| (6) | 8.0 | 1.10 | 24.0+ | ----do---- | 3+ | 5.1 | Good. |
| (7) | 10.0 | 1.01 | 24.0+ | None | 3+ | 6.5 | Fair. |
| (8) | 12.5 | 0.94 | 24.0+ | ----do---- | 3+ | 4.0 | Poor. |

The results summarized above, clearly show the increased adhesive and cohesive strength of adhesive copolymers containing maleic anhydride as an integral part thereof. They further show that good results are obtained with maleic anhydride in a concentration range of about 4 to 10 parts, by weight, of the total weight of the copolymer, with the optimum range being from about 6.5 to 9.0 parts, by weight, of the total weight of copolymer.

EXAMPLE III

This example illustrates the effect of intrinsic viscosity upon the adhesive properties of the novel adhesive copolymers of this invention.

The polymerization recipe used in this example was identical to that specified in Example I, hereinabove. The intrinsic viscosity was varied by varying solvents, solvent concentrations and reaction temperatures in the procedure, as set forth in Example I. The resulting copolymers were then evaluated by means of the above described 20° "Hold," 180° "Hold" and 180° Peel Adhesion Tests. The results of these evaluations are presented in the following table.

| Copolymer No. | Maleic Anhydride (parts, by weight, in resulting copolymer) | Intrinsic Viscosity (in acetone at 25° C.) | 20° Hold (hours) | 180° Hold (days) | 180° Peel (lbs.) | Tack |
|---|---|---|---|---|---|---|
| (1) | 7.5 | 0.78 | 2 | 3+ | 4.7 | Very good. |
| (2) | 7.5 | 0.90 | 21 | 3+ | 3.5 | Do. |
| (3) | 7.5 | 1.10 | 24+ | 3+ | 6.0 | Do. |

The results summarized in the above table, clearly indicate that improved adhesive properties result from the attainment of higher intrinsic viscosities. They further show the preferred minimum intrinsic viscosity value, i.e. 0.90, for the adhesive copolymers of this invention.

Summarizing, it is thus seen that the process of this invention provides for the preparation of pressure sensitive adhesive copolymers exhibiting excellent tack, tack retention, adhesive strength and cohesive strength. Variations may be made in proportions, procedures and materials without departing from the scope of this invention which is limited by the following claims.

We claim:

1. A pressure sensitive adhesive composition comprising a random copolymer of maleic anhydride, vinyl acetate, octyl acrylate, and ethyl acrylate; wherein the respective comonomers are present in said random copolymer in the following range of proportions as based upon the total weight of the copolymer: maleic anhydride 4–10 parts, vinyl acetate 10–30 parts, octyl acrylate 55–80 parts, and ethyl acrylate 5–20 parts.

2. The adhesive composition of claim 1, wherein said copolymer has a glass transition temperature of from about −45 to −65° C.

3. The adhesive composition of claim 1, wherein said copolymer has a preferred intrinsic viscosity, in acetone at 25° C., of at least 0.90.

4. The adhesive composition of claim 1, wherein said copolymer is dissolved in an organic solvent.

5. A pressure sensitive adhesive composition consisting of a random copolymer of maleic anhydride, vinyl acetate, octyl acrylate, and ethyl acrylate, wherein the latter comonomers are present in a ratio, by weight, of 7.5:20:70:10.

6. The adhesive composition of claim 5, wherein said copolymer has a glass transition temperature of from about −45 to −65° C.

7. The adhesive composition of claim 5, wherein said copolymer has a preferred intrinsic viscosity, in acetone at 25° C., of at least 0.90.

8. The adhesive composition of claim 5, wherein said copolymer is dissolved in an organic solvent.

9. A substrate coated with a pressure sensitive film comprising the dried, consolidated residue of a composition comprising an organic solvent solution of a random copolymer of maleic anhydride, vinyl acetate, octyl acrylate and ethyl acrylate; wherein the respective comonomers are present in said random copolymer in the following range of proportions as based upon the total weight of the copolymer: maleic anhydride 4–10 parts, vinyl acetate 10–30 parts, octyl acrylate 55–80 parts, and ethyl acrylate 5–20 parts.

10. The substrate of claim 9, wherein said copolymer has a glass transition temperature of from about −45 to −65° C.

11. The substrate of claim 9 wherein said copolymer has a preferred intrinsic viscosity, in acetone at 25° C., of at least 0.90.

12. A substrate coated with a pressure sensitive film composing the dried, consolidated resin of a composition comprising an organic solvent solution of a random copolymer of maleic anhydride, vinyl acetate, octyl acrylate, and ethyl acrylate, wherein the latter comonomers are present in a ratio, by weight, of 7.5:20:70:10.

13. The substrate of claim 12, wherein said copolymer has a glass transition temperature of from about −45 to −65° C.

14. The substrate of claim 12, wherein said copolymer has a preferred intrinsic viscosity, in acetone at 25° C., of at least 0.90.

References Cited

UNITED STATES PATENTS 3,222,419  12/1965  Jubilee et al. _____ 260—836

JOSEPH L. SCHOFER, *Primary Examiner.*

J. KIGHT, *Assistant Examiner.*